United States Patent
Stearns et al.

(10) Patent No.: US 10,014,818 B2
(45) Date of Patent: Jul. 3, 2018

(54) HEIGHT ADJUSTMENT BRACKET FOR ROOF APPLICATIONS

(71) Applicant: RILLITO RIVER SOLAR, LLC, Phoenix, AZ (US)

(72) Inventors: Brian Cecil Stearns, Tucson, AZ (US); Alexander Grant Bornemann, Phoenix, AZ (US)

(73) Assignee: Rillito River Solar, LLC, Phoenix, AZ (US)

( * ) Notice: Subject to any disclaimer, the term of this patent is extended or adjusted under 35 U.S.C. 154(b) by 0 days.

(21) Appl. No.: 15/236,175

(22) Filed: Aug. 12, 2016

(65) Prior Publication Data

US 2016/0352283 A1    Dec. 1, 2016

Related U.S. Application Data

(63) Continuation of application No. 14/928,235, filed on Oct. 30, 2015, now Pat. No. 9,431,953.

(Continued)

(51) Int. Cl.
*E04D 13/18* (2018.01)
*H02S 20/23* (2014.01)
*F16M 13/02* (2006.01)

(52) U.S. Cl.
CPC ............ *H02S 20/23* (2014.12); *F16M 13/02* (2013.01); *Y02B 10/12* (2013.01)

(58) Field of Classification Search
CPC ........ H02S 20/23; F24J 2/5203; F24J 2/5256; F24J 2002/4663; F24J 2/5254; F24J 2/5264; F24J 2/5258; F24J 2/5207
See application file for complete search history.

(56) References Cited

U.S. PATENT DOCUMENTS

| 4,321,745 A | 3/1982 | Ford |
| 4,558,544 A | 12/1985 | Albrecht et al. |

(Continued)

FOREIGN PATENT DOCUMENTS

| DE | 10062697 | 6/2006 |
| DE | 102005002828 | 8/2006 |

(Continued)

OTHER PUBLICATIONS

Non-Final Office Action for U.S. Appl. No. 14/928,235 dated Mar. 1, 2016.

(Continued)

*Primary Examiner* — Gisele D Ford
(74) *Attorney, Agent, or Firm* — The Law Office of Mark Williams, PLLC

(57) ABSTRACT

A roof mount for mounting at least one solar panel to a roof surface including a base. The roof mount includes a clamp connected to the base and a first recess sized to support a first solar panel. The first recess has a first height extending between a first top flange and a first bottom flange. The clamp also includes a second recess sized to support one of a second solar panel and a skirt flange. The second recess has a second height extending between a second top flange and a second bottom flange. The roof mount further includes a fastener connected to the clamp. The second fastener is operable to adjust the first and second heights, such that upon tightening of the second fastener, the first height increases and the second height decreases, and upon loosening of the second fastener, the first height decreases and the second height increases.

16 Claims, 17 Drawing Sheets

Related U.S. Application Data

(60) Provisional application No. 62/238,517, filed on Oct. 7, 2015, provisional application No. 62/134,205, filed on Mar. 17, 2015, provisional application No. 62/131,480, filed on Mar. 11, 2015, provisional application No. 62/106,406, filed on Jan. 22, 2015, provisional application No. 62/106,282, filed on Jan. 22, 2015, provisional application No. 62/106,410, filed on Jan. 22, 2015, provisional application No. 62/073,867, filed on Oct. 31, 2014.

(56) References Cited

U.S. PATENT DOCUMENTS

| | | | |
|---|---|---|---|
| 4,744,187 | A | 5/1988 | Tripp |
| 4,796,403 | A | 1/1989 | Fulton |
| 5,094,056 | A | 3/1992 | Peters |
| 5,274,978 | A | 1/1994 | Perkonigg et al. |
| 5,333,423 | A | 8/1994 | Propst |
| 5,479,745 | A | 1/1996 | Kawai et al. |
| 5,501,754 | A | 3/1996 | Hiraguri |
| 5,595,366 | A | 1/1997 | Cusimano et al. |
| 5,791,096 | A | 8/1998 | Chen |
| 5,862,635 | A | 1/1999 | Linse et al. |
| 6,024,330 | A | 2/2000 | Mroz et al. |
| 6,360,491 | B1 | 3/2002 | Ullman |
| 6,442,906 | B1 | 9/2002 | Hwang |
| 6,453,623 | B1 | 9/2002 | Nelson et al. |
| 6,536,729 | B1 | 3/2003 | Haddock |
| 6,672,018 | B2 | 1/2004 | Shingleton |
| 6,772,564 | B2 | 8/2004 | Leon |
| 7,001,098 | B2 | 2/2006 | Lin et al. |
| 7,174,677 | B1 | 2/2007 | Dressler |
| 7,592,537 | B1 | 9/2009 | West |
| 7,600,349 | B2 | 10/2009 | Liebendorfer |
| 7,857,269 | B2 | 12/2010 | Plaisted et al. |
| 8,109,048 | B2 | 2/2012 | West et al. |
| 8,122,648 | B1 | 2/2012 | Liu |
| 8,146,299 | B2 | 4/2012 | Stearns et al. |
| 8,151,522 | B2 | 4/2012 | Stearns et al. |
| 8,153,700 | B2 | 4/2012 | Stearns et al. |
| 8,166,713 | B2 | 5/2012 | Stearns et al. |
| 8,166,720 | B2 | 5/2012 | Garrigus |
| 8,177,180 | B2 | 5/2012 | Plaisted et al. |
| 8,181,398 | B2 | 5/2012 | Stearns et al. |
| 8,209,914 | B2 | 7/2012 | Stearns et al. |
| 8,225,557 | B2 | 7/2012 | Stearns et al. |
| 8,245,454 | B2 | 8/2012 | Stearns et al. |
| 8,272,174 | B2 | 9/2012 | Stearns et al. |
| 8,328,149 | B2 | 12/2012 | McLaughlin |
| 8,375,654 | B1 | 2/2013 | West et al. |
| 8,397,443 | B2 | 3/2013 | Blom et al. |
| 8,413,388 | B2 | 4/2013 | Stearns et al. |
| 8,505,864 | B1 | 8/2013 | Taylor et al. |
| 8,584,406 | B2 | 11/2013 | Wexler et al. |
| 8,627,617 | B2 | 1/2014 | Haddock et al. |
| 8,683,761 | B2 | 4/2014 | Danning |
| 8,733,037 | B2 | 5/2014 | Bindschedler et al. |
| 8,756,881 | B2 | 6/2014 | West et al. |
| 8,806,813 | B2 | 8/2014 | Plaisted et al. |
| 8,833,714 | B2 | 9/2014 | Haddock et al. |
| 8,857,113 | B2 | 10/2014 | Zhang |
| 8,875,455 | B1 | 11/2014 | Yang et al. |
| 8,925,263 | B2 | 1/2015 | Haddock et al. |
| 8,938,932 | B1 | 1/2015 | Wentworth et al. |
| 8,943,765 | B2 | 2/2015 | Danning et al. |
| 8,946,540 | B1 | 2/2015 | West et al. |
| 8,955,267 | B2 | 2/2015 | Wexler et al. |
| 8,984,819 | B1 | 3/2015 | Yang et al. |
| 8,991,114 | B2 | 3/2015 | West |
| 9,003,729 | B2 | 4/2015 | West et al. |
| 9,010,040 | B2 | 4/2015 | Damo |
| 9,010,041 | B2 | 4/2015 | Danning |
| 9,062,897 | B2 | 6/2015 | West et al. |
| 9,080,792 | B2 | 7/2015 | Patton et al. |
| 9,097,441 | B2 | 8/2015 | West et al. |
| 9,109,371 | B2 | 8/2015 | Hudson et al. |
| 9,121,545 | B2 | 9/2015 | Stanley |
| 9,154,074 | B2 | 10/2015 | West et al. |
| 9,166,524 | B2 | 10/2015 | West et al. |
| 9,231,517 | B2 | 1/2016 | West et al. |
| 2002/0046506 | A1 | 4/2002 | Ullman |
| 2003/0070368 | A1 | 4/2003 | Shingleton |
| 2004/0163338 | A1 | 8/2004 | Liebendorfer |
| 2006/0010786 | A1 | 1/2006 | Rogers |
| 2006/0053706 | A1 | 3/2006 | Russell |
| 2006/0086382 | A1 | 4/2006 | Plaisted |
| 2006/0260670 | A1 | 11/2006 | Terunuma et al. |
| 2007/0245636 | A1 | 10/2007 | Ayer |
| 2008/0053008 | A1 | 3/2008 | Ohkoshi et al. |
| 2008/0121273 | A1 | 5/2008 | Plaisted et al. |
| 2008/0250614 | A1 | 10/2008 | Zante |
| 2009/0194098 | A1 | 8/2009 | Placer |
| 2009/0282755 | A1 | 11/2009 | Abbott et al. |
| 2009/0309388 | A1 | 12/2009 | Ellison |
| 2010/0236155 | A1 | 9/2010 | Lanza |
| 2010/0307074 | A1 | 12/2010 | Stearns et al. |
| 2011/0000519 | A1 | 1/2011 | West |
| 2011/0000520 | A1 | 1/2011 | West |
| 2011/0000526 | A1 | 1/2011 | West |
| 2011/0000544 | A1 | 1/2011 | West |
| 2011/0001030 | A1 | 5/2011 | Hochreiter et al. |
| 2011/0154750 | A1 | 6/2011 | Welster et al. |
| 2011/0214365 | A1 | 9/2011 | Aftanas |
| 2011/0239546 | A1 | 10/2011 | Tsuzuki et al. |
| 2011/0260027 | A1 | 10/2011 | Farnham, Jr. |
| 2011/0277402 | A1 | 11/2011 | Schnitzer |
| 2011/0302857 | A1 | 12/2011 | McClellan et al. |
| 2011/0302859 | A1 | 12/2011 | Crasnianski |
| 2012/0017526 | A1 | 1/2012 | Eide |
| 2012/0023843 | A1 | 2/2012 | Stearns et al. |
| 2012/0073219 | A1 | 3/2012 | Zuritis |
| 2012/0073220 | A1 | 3/2012 | Kobayashi et al. |
| 2012/0079781 | A1 | 4/2012 | Koller |
| 2012/0102853 | A1 | 5/2012 | Rizzo |
| 2012/0125410 | A1 | 5/2012 | West et al. |
| 2012/0138764 | A1 | 6/2012 | Kemple |
| 2012/0144760 | A1 | 6/2012 | Schaefer et al. |
| 2012/0152326 | A1 | 6/2012 | West et al. |
| 2012/0192926 | A1 | 8/2012 | Kambara et al. |
| 2012/0233958 | A1 | 9/2012 | Stearns |
| 2012/0234378 | A1 | 9/2012 | West et al. |
| 2012/0240484 | A1 | 9/2012 | Blom et al. |
| 2012/0255598 | A1 | 10/2012 | West |
| 2012/0260972 | A1 | 10/2012 | West et al. |
| 2012/0266946 | A1 | 10/2012 | West et al. |
| 2012/0279558 | A1 | 11/2012 | West et al. |
| 2012/0298186 | A1 | 11/2012 | West |
| 2012/0298188 | A1 | 11/2012 | West et al. |
| 2012/0298817 | A1 | 11/2012 | West et al. |
| 2012/0301661 | A1 | 11/2012 | West et al. |
| 2013/0008102 | A1 | 1/2013 | Bindschedler et al. |
| 2013/0009025 | A1 | 1/2013 | Stearns |
| 2013/0074441 | A1 | 3/2013 | Stearns |
| 2013/0091786 | A1 | 4/2013 | DuPont et al. |
| 2013/0104471 | A1 | 5/2013 | Kobayashi |
| 2013/0125492 | A1 | 5/2013 | Molek et al. |
| 2013/0140416 | A1 | 5/2013 | West et al. |
| 2013/0180572 | A1 | 7/2013 | West |
| 2013/0180573 | A1 | 7/2013 | West |
| 2013/0180574 | A1 | 7/2013 | West et al. |
| 2013/0183084 | A1 | 7/2013 | West et al. |
| 2013/0192150 | A1 | 8/2013 | DuPont et al. |
| 2013/0284239 | A1 | 10/2013 | Hyunrok |
| 2013/0291479 | A1 | 11/2013 | Schaefer et al. |
| 2013/0333305 | A1 | 12/2013 | Stearns et al. |
| 2013/0333310 | A1 | 12/2013 | Damo |
| 2013/0340811 | A1 | 12/2013 | Danning et al. |
| 2014/0026946 | A1 | 1/2014 | West et al. |
| 2014/0041321 | A1 | 2/2014 | Poivet |
| 2014/0042286 | A1 | 2/2014 | Jaffari |
| 2014/0053891 | A1 | 2/2014 | West et al. |
| 2014/0102997 | A1 | 4/2014 | West et al. |
| 2014/0109496 | A1 | 4/2014 | Stapleton |

(56) References Cited

U.S. PATENT DOCUMENTS

| | | |
|---|---|---|
| 2014/0130847 A1 | 4/2014 | West et al. |
| 2014/0137489 A1 | 5/2014 | Habdank et al. |
| 2014/0158184 A1 | 6/2014 | West et al. |
| 2014/0174511 A1 | 6/2014 | West et al. |
| 2014/0175244 A1 | 6/2014 | West et al. |
| 2014/0182662 A1 | 7/2014 | West et al. |
| 2014/0223838 A1 | 8/2014 | West et al. |
| 2014/0246549 A1 | 9/2014 | West et al. |
| 2014/0251431 A1 | 9/2014 | West et al. |
| 2014/0252288 A1 | 9/2014 | Stearns et al. |
| 2014/0299179 A1 | 10/2014 | West et al. |
| 2014/0305046 A1 | 10/2014 | Stearns et al. |
| 2014/0326838 A1 | 11/2014 | West et al. |
| 2014/0331572 A1 | 11/2014 | Singelyn, Jr. |
| 2014/0339179 A1 | 11/2014 | West et al. |
| 2014/0353435 A1 | 12/2014 | Liu et al. |
| 2014/0360558 A1 | 12/2014 | West et al. |
| 2015/0013756 A1 | 1/2015 | West et al. |
| 2015/0033658 A1 | 2/2015 | West et al. |
| 2015/0040965 A1 | 2/2015 | West et al. |
| 2015/0040967 A1 | 2/2015 | West et al. |
| 2015/0041251 A1 | 2/2015 | Hudson et al. |
| 2015/0068590 A1 | 3/2015 | West et al. |
| 2015/0069198 A1 | 3/2015 | West et al. |
| 2015/0075100 A1 | 3/2015 | West et al. |
| 2015/0075589 A1 | 3/2015 | West et al. |
| 2015/0075590 A1 | 3/2015 | West et al. |
| 2015/0107168 A1 | 4/2015 | Kobayashi |
| 2015/0129517 A1 | 5/2015 | Wildes |
| 2015/0155820 A1 | 6/2015 | West |
| 2015/0155821 A1 | 6/2015 | West |
| 2015/0155823 A1 | 6/2015 | West et al. |
| 2015/0168021 A1 | 6/2015 | Wentworth et al. |
| 2015/0180405 A1 | 6/2015 | West et al. |
| 2015/0200618 A9 | 7/2015 | West et al. |
| 2015/0204372 A1 | 7/2015 | West et al. |
| 2015/0218822 A1 | 8/2015 | Blazley |
| 2015/0222221 A1 | 8/2015 | West |
| 2015/0222222 A1 | 8/2015 | West |
| 2015/0222225 A1 | 8/2015 | Danning |
| 2015/0249423 A1 | 9/2015 | Braunstein et al. |
| 2015/0280639 A1 | 10/2015 | Atchley et al. |
| 2015/0288320 A1 | 10/2015 | Stearns et al. |
| 2015/0303865 A1 | 10/2015 | West et al. |
| 2015/0316292 A1 | 11/2015 | West |

FOREIGN PATENT DOCUMENTS

| | | |
|---|---|---|
| DE | 102005039495 | 3/2007 |
| DE | 102005059487 | 7/2007 |
| DE | 102006022870 | 9/2007 |
| DE | 102007026819 | 12/2007 |
| DE | 102008000293 | 8/2009 |
| DE | 102008012717 | 9/2009 |
| JP | H08296311 | 11/1996 |
| JP | 2642606 | 8/1997 |
| JP | 2931240 | 8/1999 |
| JP | 2972761 | 11/1999 |
| JP | 3041279 | 5/2000 |
| JP | 2000345664 | 12/2000 |
| JP | 2004060358 | 2/2004 |
| JP | 4041805 | 2/2008 |
| JP | 2008127866 | 6/2008 |
| JP | 4382143 | 12/2009 |
| JP | 2010209515 | 12/2009 |
| JP | 2010242367 | 10/2010 |
| JP | 2011006864 | 1/2011 |
| JP | 2011106188 | 6/2011 |
| WO | 2007093421 | 8/2007 |
| WO | 2012125327 | 9/2012 |
| WO | 2013009375 | 1/2013 |
| WO | 2013043816 | 3/2013 |
| WO | 2015020817 | 2/2015 |
| WO | 2015023526 | 2/2015 |
| WO | 2015039007 | 3/2015 |
| WO | 2015042260 | 3/2015 |
| WO | 2015112461 | 7/2015 |
| WO | 2015160644 | 10/2015 |
| WO | 2015183971 | 12/2015 |

OTHER PUBLICATIONS

Notice of Allowance for U.S. Appl. No. 14/928,235 dated Aug. 5, 2016.
Non-Final Office Action for U.S. Appl. No. 14/680,226 dated Jan. 15, 2016.
Non-Final Office Action for U.S. Appl. No. 14/680,226 dated Jun. 14, 2016.
Final Office Action for U.S. Appl. No. 14/680,226 dated Dec. 15, 2016.
Non-Final Office Action for U.S. Appl. No. 15/286,000 dated Aug. 18, 2017.
Non-Final Office Action for U.S. Appl. No. 15/286,000 dated Oct. 30, 2017.

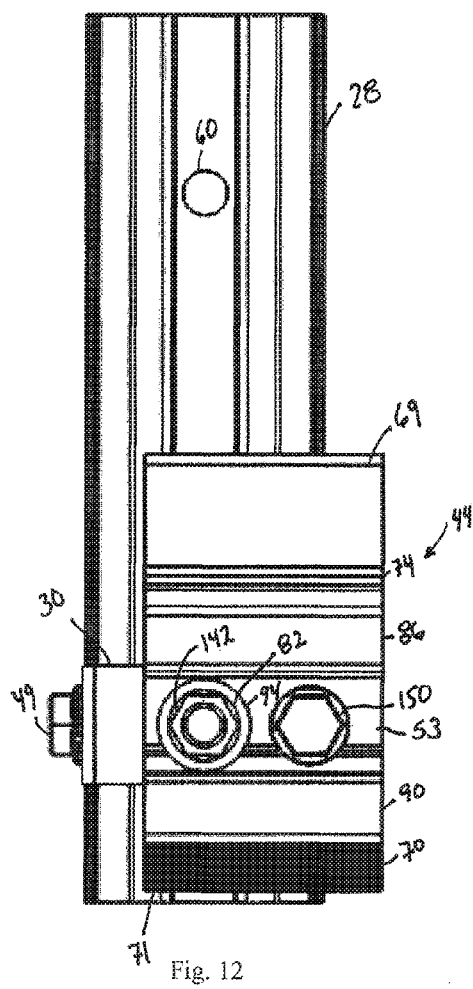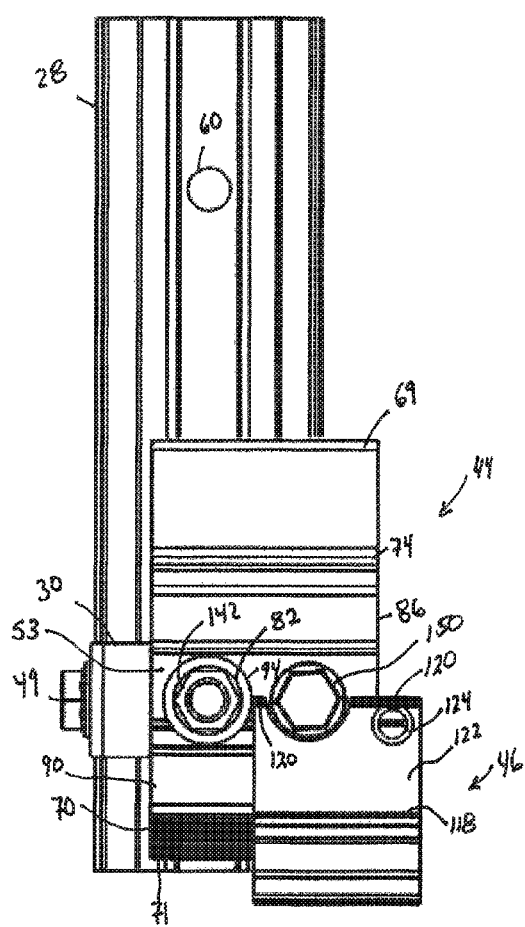
Fig. 12                    Fig. 13

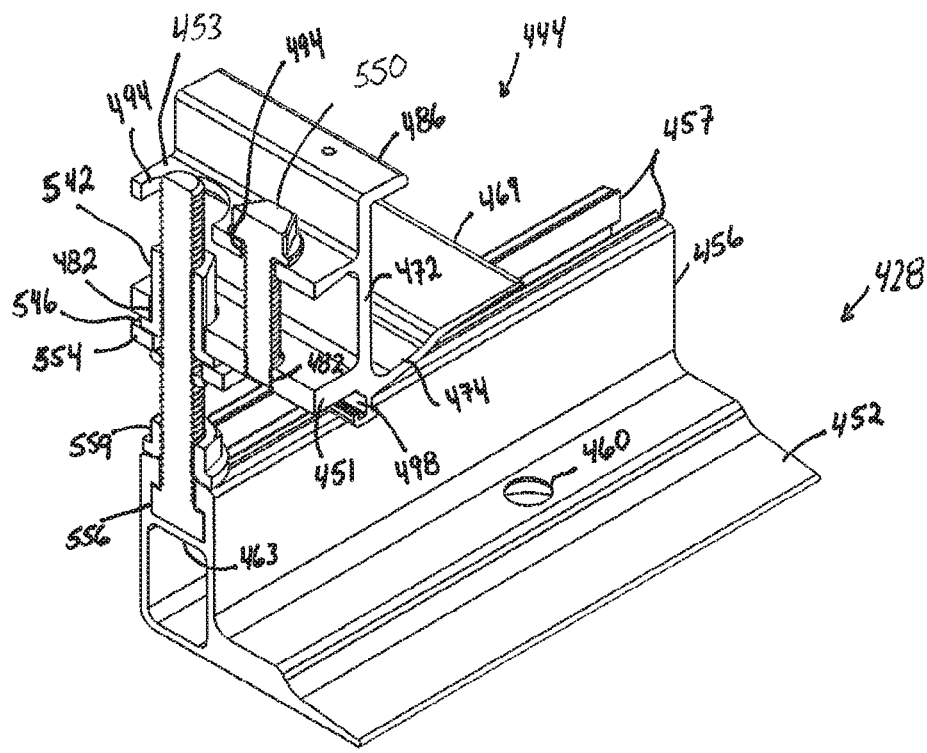
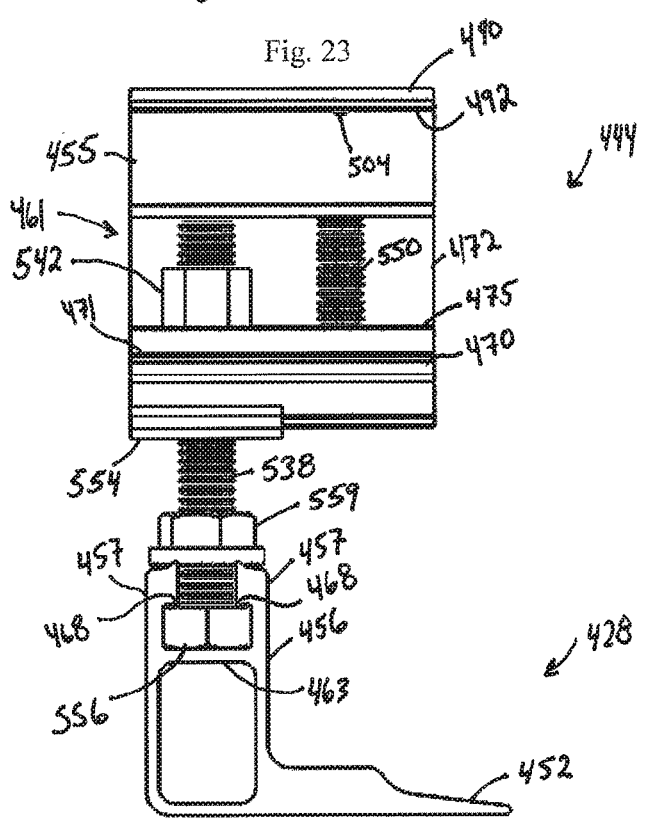
Fig. 23
Fig. 24

HEIGHT ADJUSTMENT BRACKET FOR ROOF APPLICATIONS

CROSS-REFERENCES TO RELATED APPLICATIONS

The present application is a continuation of U.S. patent application Ser. No. 14/928,235, filed on Oct. 30, 2015 (the '235 Application). The '235 application claims the benefit of and priority to U.S. Provisional Patent Application No. 62/238,517, filed Oct. 7, 2015, and to U.S. Provisional Patent Application No. 62/134,205, filed Mar. 17, 2015, and to U.S. Provisional Patent Application No. 62/131,480, filed Mar. 11, 2015, and to U.S. Provisional Patent Application No. 62/106,410, filed Jan. 22, 2015, and to U.S. Provisional Patent Application No. 62/106,406, filed Jan. 22, 2015, and to U.S. Provisional Patent Application No. 62/106,282, filed Jan. 22, 2015, and to U.S. Provisional Patent Application No. 62/073,867, filed Oct. 31, 2014, the entire contents of all of which are hereby incorporated by reference herein.

BACKGROUND

The present invention relates to a roof mount system for mounting at least one object above a roof surface.

SUMMARY

In some embodiments, the invention provides a roof mount for mounting at least one solar panel to a roof surface including a base positioned on the roof surface and coupled to the roof surface. The base defines a slot extending in a first direction, wherein the first direction extends substantially parallel to the roof surface. The roof mount also includes a first fastener having a head positioned in the slot and moveable along the slot in the first direction, and a shaft extending in a second direction, wherein the second direction extends substantially perpendicular to the roof surface. The roof mount further includes a clamp connected to the base by the first fastener, a distance between the clamp and the base is adjustable in the second direction. The clamp includes a first recess sized to receive and support a first solar panel. The first recess is defined between a first top flange and a first bottom flange. The first recess has a first height extending between the first top flange and the first bottom flange. The first height is adjustable. The clamp also includes a second recess sized to receive and support one of a second solar panel and a skirt flange. The second recess is defined between a second top flange and a second bottom flange. The second recess has a second height extending between the second top flange and the second bottom flange. The second height is adjustable. The roof mount further includes a second fastener connected to the clamp. The second fastener is operable to adjust the first and second heights, such that upon tightening of the second fastener, the first height increases and the second height decreases, and such that upon loosening of the second fastener, the first height decreases and the second height increases.

In some embodiments, the invention provides a roof mount for mounting at least one solar panel to a roof surface. The roof mount includes a base positioned on the roof surface and connected to the roof surface. The base defines a slot extending along a first axis, and the first axis extends substantially parallel to the roof surface. A first fastener has a head positioned in the slot and capable of moving in the slot along the first axis, and a shaft which extends along a second axis. The second axis extends substantially perpendicular to the roof surface. A clamp is connected to the base by the first fastener and a distance between the clamp and the base along the second axis is adjustable. The clamp includes a first bottom flange that supports a first solar panel, a second bottom flange that supports one of a second solar panel and a skirt flange, a resilient wall positioned between the first and second bottom flanges, a first top flange positioned at a first height relative to the first bottom flange, and a second top flange positioned at a second height relative to the second bottom flange. A second fastener is connected to the clamp and upon tightening of the second fastener, the resilient wall deflects in a first direction thereby increasing the first height and decreasing the second height, and upon loosening of the second fastener, the resilient wall deflects in a second direction opposite to the first direction thereby decreasing the first height and increasing the second height.

Other aspects of the invention will become apparent by consideration of the detailed description and accompanying drawings.

BRIEF DESCRIPTION OF THE DRAWINGS

FIG. 12 is a top view of the mounting bracket of FIG. 11.

FIG. 13 is a top view of the mounting bracket of FIG. 4.

FIG. 23 is a cross sectional view of the mounting bracket taken along line 23-23 of FIG. 21.

FIG. 24 is a front view of the mounting bracket of FIG. 21.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present invention and do not alone indicate or imply that the device or element referred to must have a particular orientation. In addition, terms such as "first" and "second" are used herein for purposes of description and are not intended to indicate or imply relative importance or significance.

Figure 1:
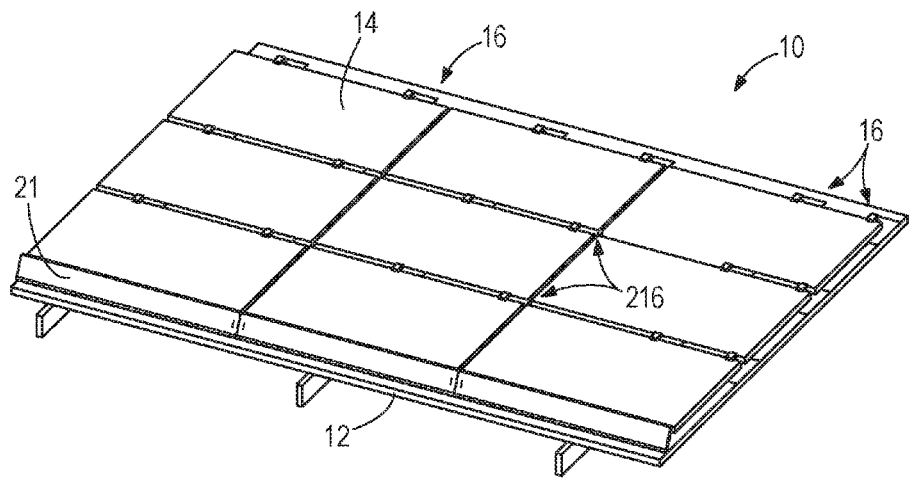
FIG. 1 illustrates a plurality of solar panels coupled to a roof by a plurality of mounting brackets according to some embodiments of the invention.
Figure 2:
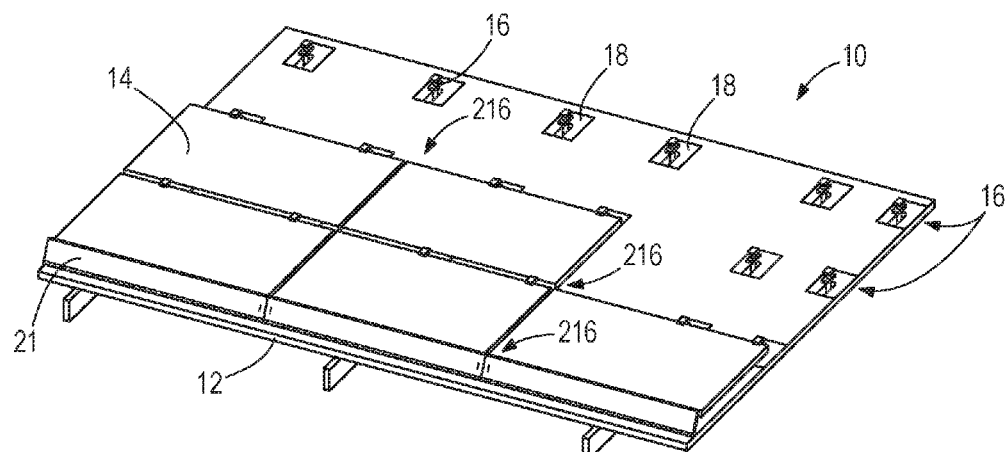
FIG. 2 is a perspective view similar to FIG. 1 with some of the solar panels removed.
Figure 3:
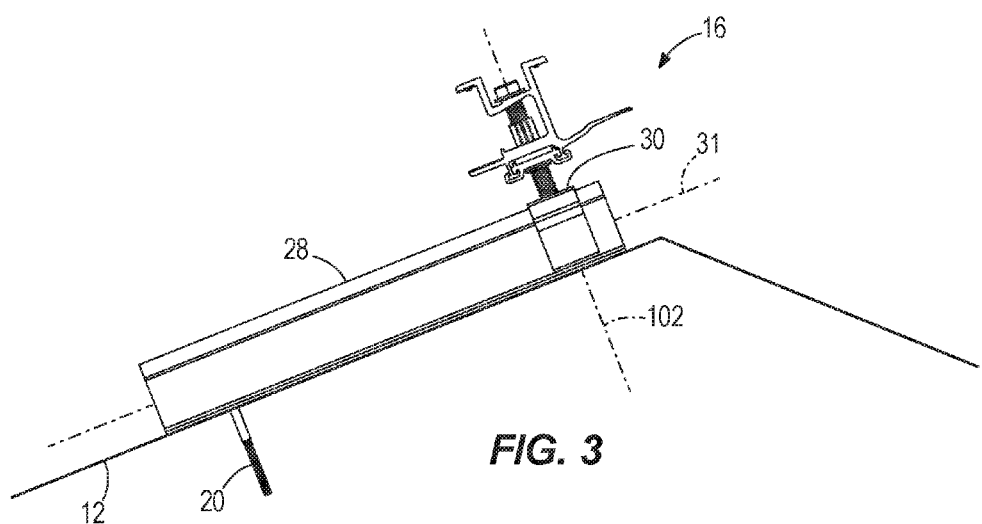
FIG. 3 illustrates a mounting bracket according to some embodiments of the invention coupled to the roof by a fastener.
Figure 4:
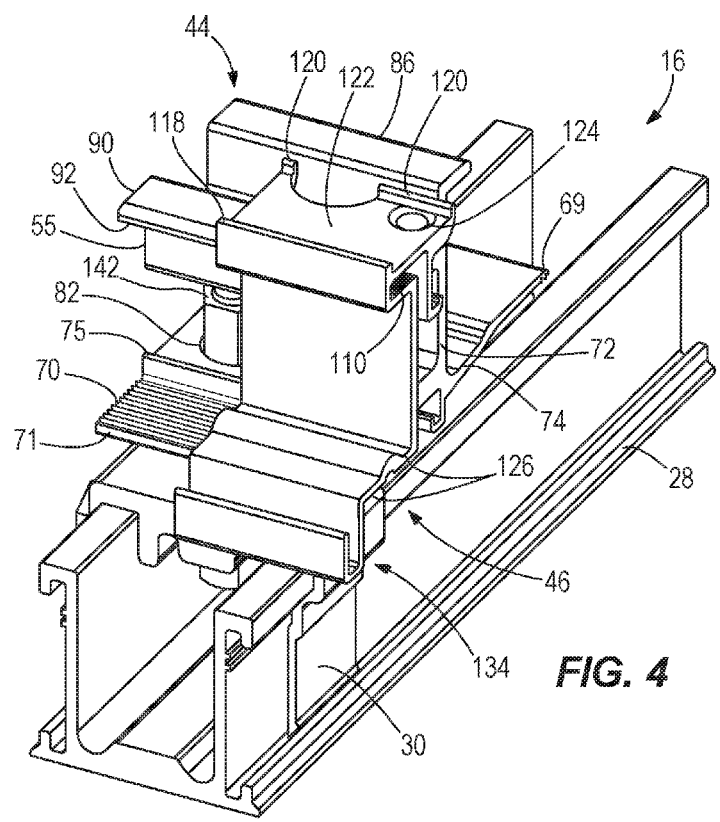
FIG. 4 is a perspective view of the mounting bracket of FIG. 3 including a removable skirt bracket.

FIGS. 1-3 illustrate a roof mount system 10 including a roof 12, a plurality of solar panels 14, a plurality of mounting brackets 16, flashing 18 and a skirt 21. The solar panels 14 are mounted to the roof 12 via the plurality of mounting brackets 16. In the illustrated embodiment, the solar panels 14 are orientated in a grid array. The solar panels 14 are coupled to the mounting brackets 16 located in a corresponding grid array on the roof 12. In particular, the mounting brackets 16 are coupled to the solar panels 14 on the periphery of the major (e.g., horizontal) length of the solar panels 14. Furthermore, the mounting brackets 16 are secured to the roof 12 by a roof fastener 20 (FIG. 3). In other embodiments, the roof mount system 10 may secure other components to the roof 12 in addition to or in lieu of the solar panels 14.

The illustrated mounting brackets 16 are constructed to connect a single solar panel 14 to the roof 12 or to connect a plurality of solar panels 14 to the roof 12. The illustrated mounting brackets 16 can also couple a plurality of solar panels 14 together. In addition, the mounting brackets 16 can support the skirt 21 on the roof 12. The illustrated skirt 21 may extend along the entire length of the solar panels 14 at the bottom of the array of solar panels 14. For example, the skirt 21 is located near a gutter system (not shown) or outer perimeter of the roof 12. The skirt 21 provides a barrier between the ambient environment surrounding the solar panels 14 and the area located between the roof 12 and the solar panels 14. For example, the skirt 21 is utilized to inhibit a substantial pressure differential between the ambient environment and an area under the solar panels 14.

The flashing 18 is positioned between the mounting brackets 16 and the roof 12 to inhibit leakage of fluids (e.g., rain water, snow, etc.) through the roof 12 while providing a structure to which the mounting brackets 16 are securely mounted. The flashing 18 is described in detail in U.S. Pat. No. 8,209,914, issued Jul. 3, 2012, the contents of which are herein incorporated by reference.

Figure 5:
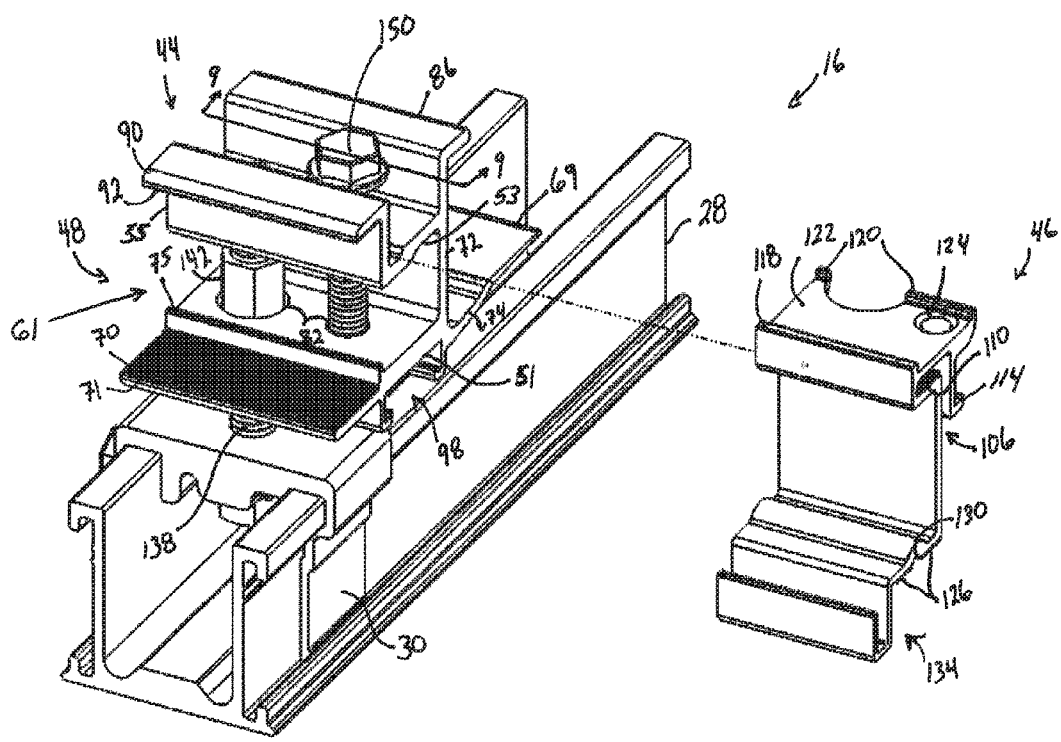
FIG. 5 is a partial exploded view of the mounting bracket of FIG. 4.
Figure 6:
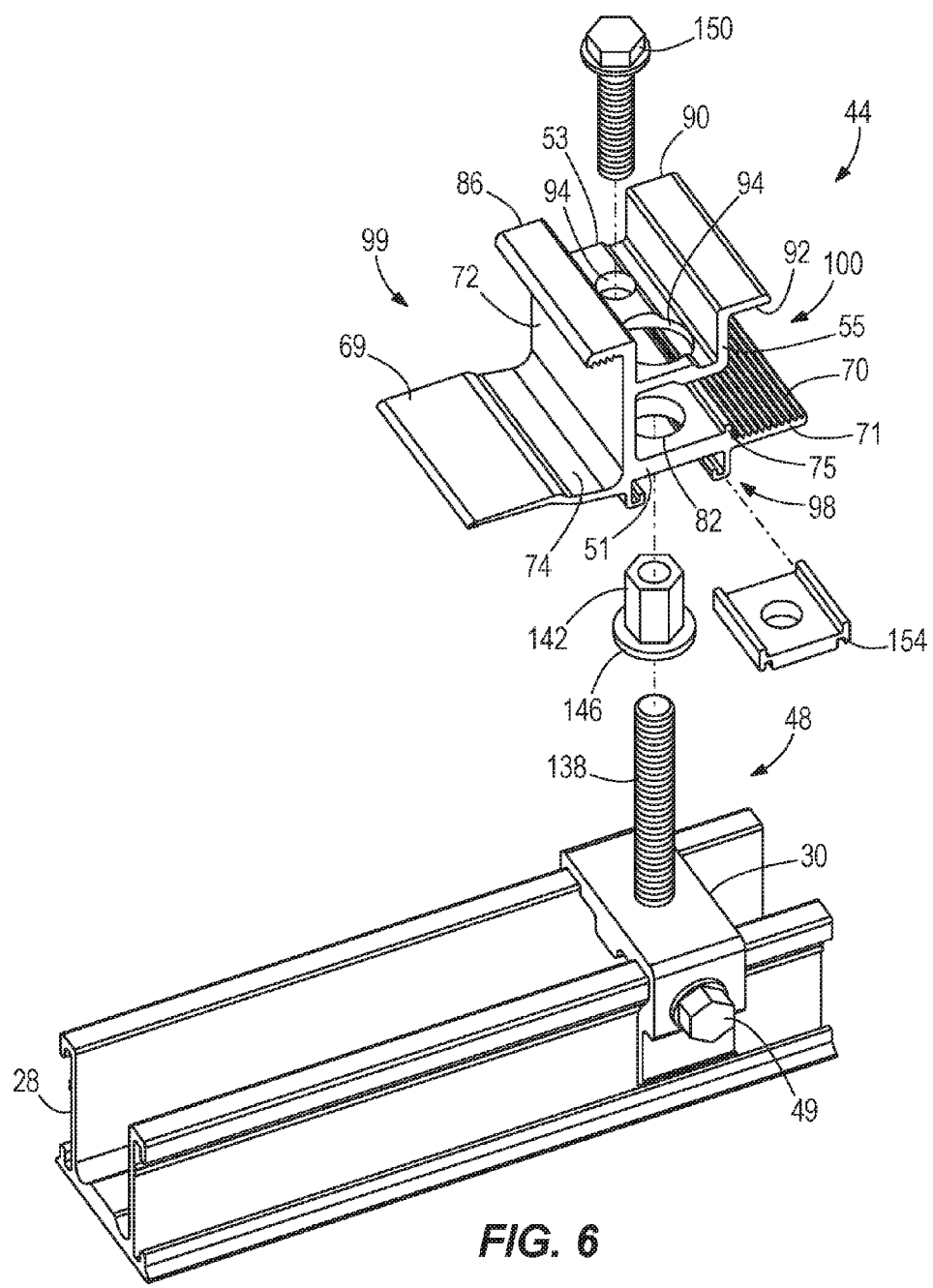
FIG. 6 is a first exploded view of the mounting bracket of FIG. 4 with the skirt bracket removed.
Figure 7:
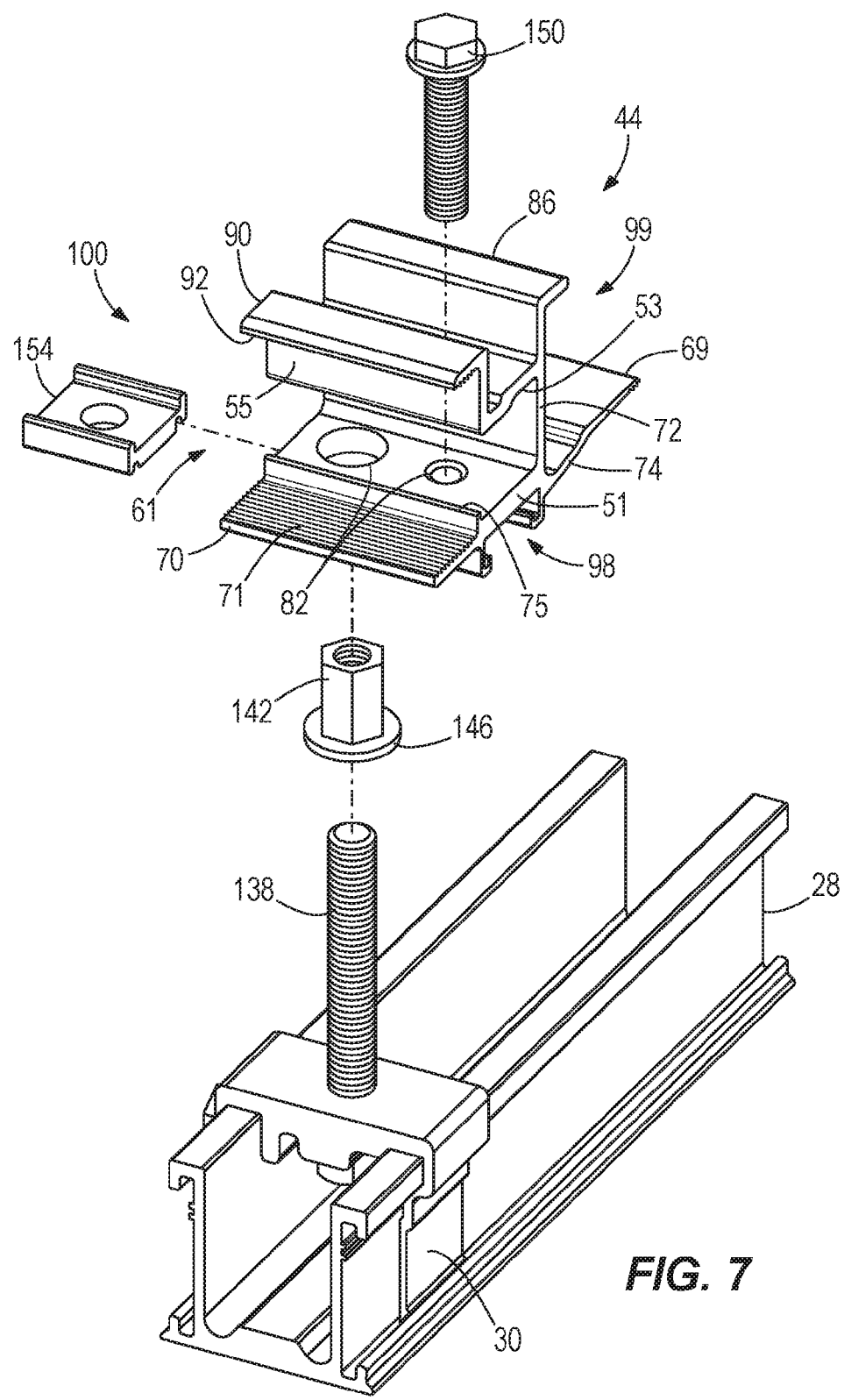
FIG. 7 is a second exploded view of the mounting bracket of FIG. 4 with the skirt bracket removed.
Figure 8:
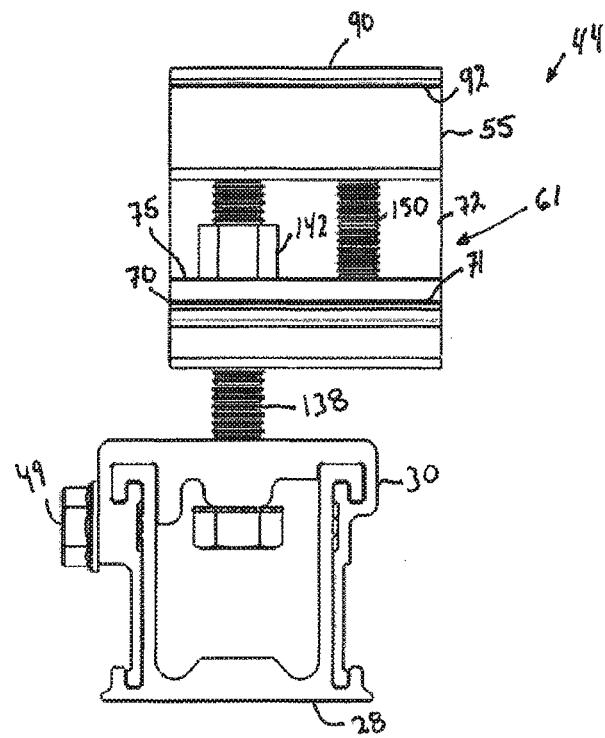
FIG. 8 is a front view of the mounting bracket of FIG. 4 with the skirt bracket removed.
Figure 9:
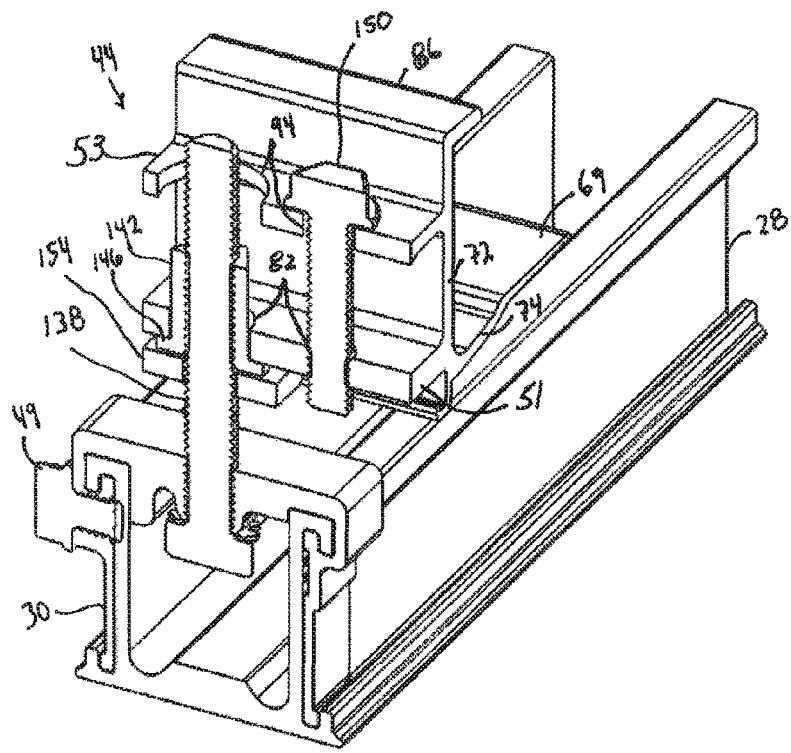
FIG. 9 is a cross sectional view of the mounting bracket taken along line 9-9 of FIG. 5.

With reference to FIGS. 3-16, the mounting bracket 16 includes a slide 28, standoff 30, a clamp 44, an adapter or skirt bracket 46, and an adjustment assembly 48 (FIG. 6). The illustrated slide 28 abuts the flashing 18 and both are secured to the roof 12 by the roof fastener 20 received through a mounting aperture 60 (FIGS. 12 and 13). The slide 28 includes upper and lower grooves that engage upper and lower protrusions of the standoff 30 such that the standoff 30 is movable along a first axis 31 relative to the slide 28 (FIG. 3). The first axis 31 extends substantially parallel to the roof 12. The standoff 30 is selectively fixed relative to the slide 28 by a locking bolt 49 (FIG. 6). In the illustrated embodiment, the slide 28 and the standoff 30 form a base for supporting at least one solar panel above the roof 12. The illustrated locking bolt 49 may also function as a grounding bolt to electrically connect the slide 28 to the standoff 30 to enable electrical current to flow therebetween.

The illustrated clamp 44 defines a unitary, monolithic component including a lower central portion 51, a first support flange 69, a second support flange 70, and a resilient wall or a first upright portion 72. The lower central portion 51 and the resilient wall 72 are positioned between the support flanges 69, 70. The illustrated first support flange 69 includes a depression 74, and the illustrated second support flange 70 includes teeth 71 adjacent a divider 75 positioned between the teeth 71 and the central portion 51. The illustrated lower central portion 51 includes apertures 82 with one of the apertures being a threaded aperture and the other aperture being a non-threaded aperture.

A first upper clamp flange 86 and an upper central portion 53 extend oppositely from the wall 72. The upper central portion 53 is coupled to a second upright portion 55 and the second upright portion 55 is coupled to a second upper clamp flange or skirt flange 90. The illustrated upper central portion 53 defines apertures 94 and extends from the wall 72 between the first upper clamp flange 86 and the lower central portion 51. The illustrated second upright portion 55 is oriented generally parallel to the wall 72, and the illustrated second upper clamp flange 90 extends generally parallel to the first upper clamp flange 86. In the illustrated embodiment, a gap 61 is positioned between the divider 75 and the upper central portion 53, and the wall 72 is the only component that connects the clamp flanges 86, 90, the second upright portion 55, and the upper central portion 53 to the lower central portion 51. In addition, a channel 98 is formed below the support flanges 69, 70 extending towards the standoff 30. The clamp 44 is moveable relative to the standoff 30 along a second axis 102 with the second axis 102 generally perpendicular to the plane defined by the roof 12 (FIG. 3).

Figure 10:
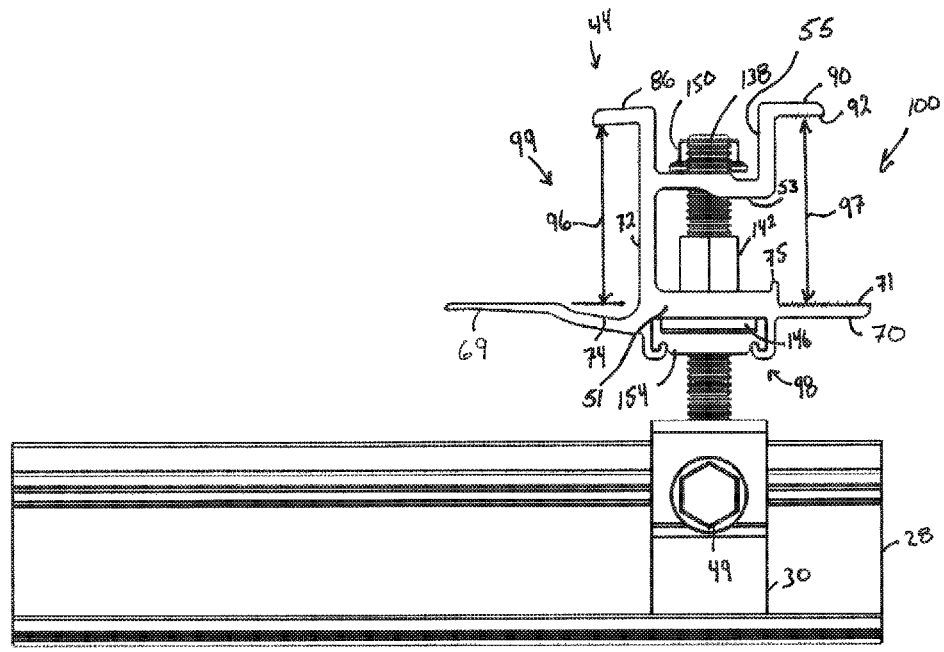
FIG. 10 is a left side view of the mounting bracket of FIG. 4 with the skirt bracket removed.
Figure 11:
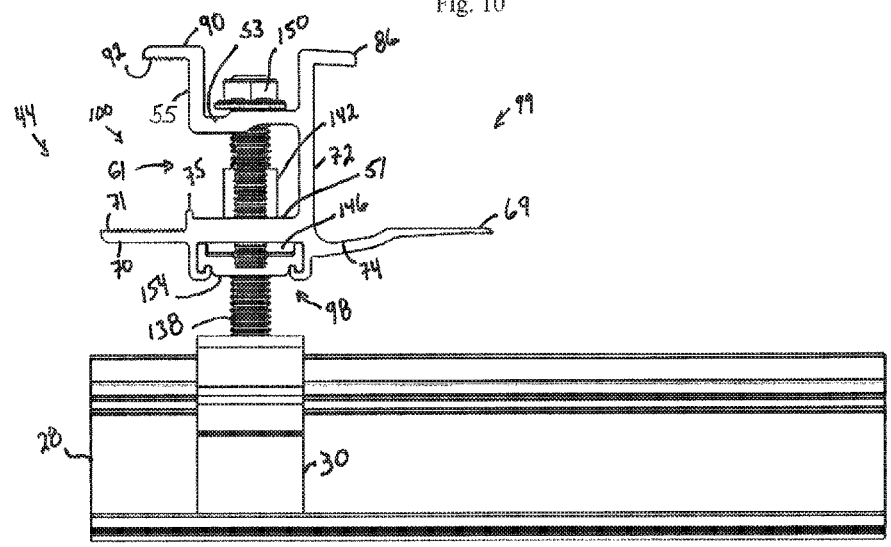
FIG. 11 is a right side view of the mounting bracket of FIG. 4 with the skirt bracket removed.

With reference to FIG. 10, the illustrated first upper clamp flange 86 is spaced from the first support flange 69 to define a first recess 99 spanning a first distance 96. The illustrated second upper clamp flange 90 is spaced from the second support flange 70 to define a second recess 100 spanning a second distance 97. The second distance 97 is greater than the first distance 96 when the mounting bracket 16 is not coupled to a solar panel 14.

In some embodiments, as described in detail below, the mounting bracket 16 may include contacts that protrude from the clamp flanges 86, 90 toward the corresponding support flange 69, 70. In further embodiments, the contacts may protrude from the support flange 69, 70 toward the corresponding clamp flange 86, 90. The contacts provide direct engagement between the mounting bracket 16 and the solar panels 14 enabling electrical current to flow therebetween.

Figure 14:
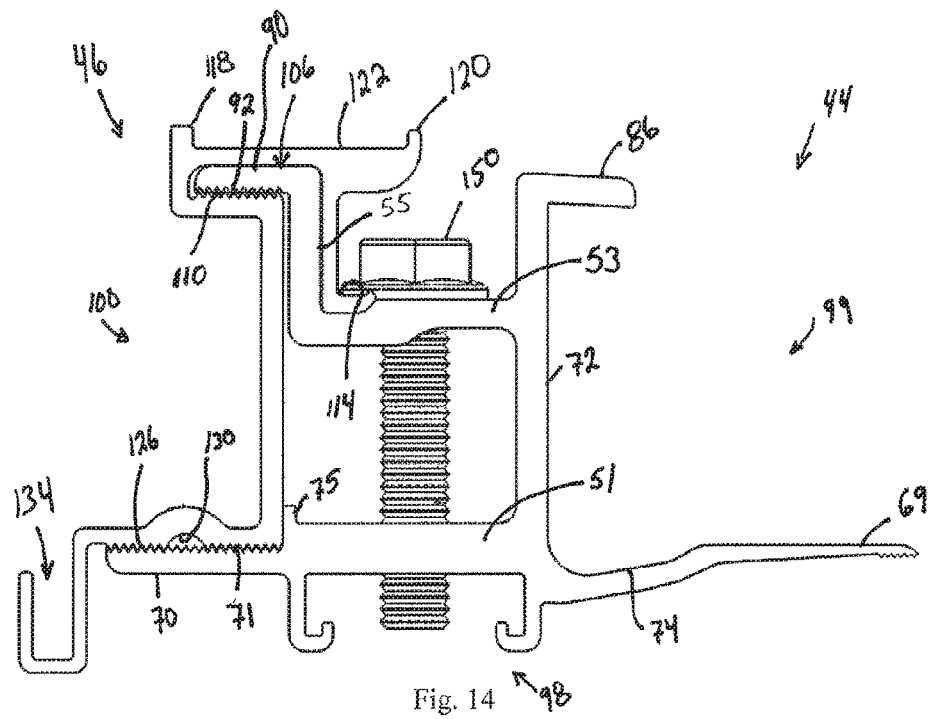
FIG. 14 is a side view of a portion of the mounting bracket of FIG. 11.

With reference to FIGS. 4, 5, and 13-16, the skirt bracket 46 includes a channel 106 that is sized to receive the second upper clamp flange 90 and the second upright portion 55. The channel 106 has teeth 110 that are configured to engage the teeth 92 of the second clamp flange 90. The illustrated skirt bracket 46 also includes a clamp surface 114 positioned adjacent the upper central portion 53 and a top surface 122 between a rail 118 and fingers 120 both extending away from the top surface 122 (FIG. 14). The top surface 122 includes a threaded aperture 124 extending towards the clamp surface 114 (FIG. 5). The illustrated skirt bracket 46 extends from the second upper clamp flange 90 to the second support flange 70 with the skirt bracket 46 including teeth 126 configured to engage the teeth 71. In other embodiments, a roughened surface may replace the teeth 71, 92, 110, 126 to provide an increase in coefficient of friction between the engagement of teeth 92, 110 and teeth 71, 126. The illustrated teeth 126 are separated into two portions by a raised surface 130 providing clearance between the teeth 71 and the skirt bracket 46. The illustrated raised surface 130 extends the entire width of the skirt bracket 46 and is configured to provide clearance for the electrical contacts, so the skirt bracket 46 can slide relative to the clamp 44. In other embodiments, the raised surface 130 may only extend partially the width of the skirt bracket 46. The illustrated skirt bracket 46 also includes a channel 134 that extends below the second support flange 70 and away from the second clamp flange 90.

With reference to FIG. 6, the illustrated adjustment assembly 48 includes a stud 138, an adjustment nut 142 having a protrusion 146, a fastener 150, and an insert 154. The stud 138 is fixed to and extends from the standoff 30 with the clamp 44 received on the stud 138. The adjustment nut 142 is received through one of the apertures 82, e.g., the non-threaded aperture, with the corresponding aperture 94 providing access to the adjustment nut 142 to rotate the adjustment nut 142. The illustrated insert 154 slidably engages the channel 98 below the adjustment nut 142 for the protrusion 146 to abut the insert 154 to hold the adjustment nut 142 in place within the aperture 82. The adjustment nut 142 and the insert 154 are both received on the stud 138. The illustrated fastener 150 threadably engages the threaded aperture 82 through the aperture 94. In the illustrated embodiment, the threaded aperture 82—and ultimately the fastener 150—is spaced from the wall 72. In other words, the fastener 150 is offset relative to the wall 72.

Figure 15:
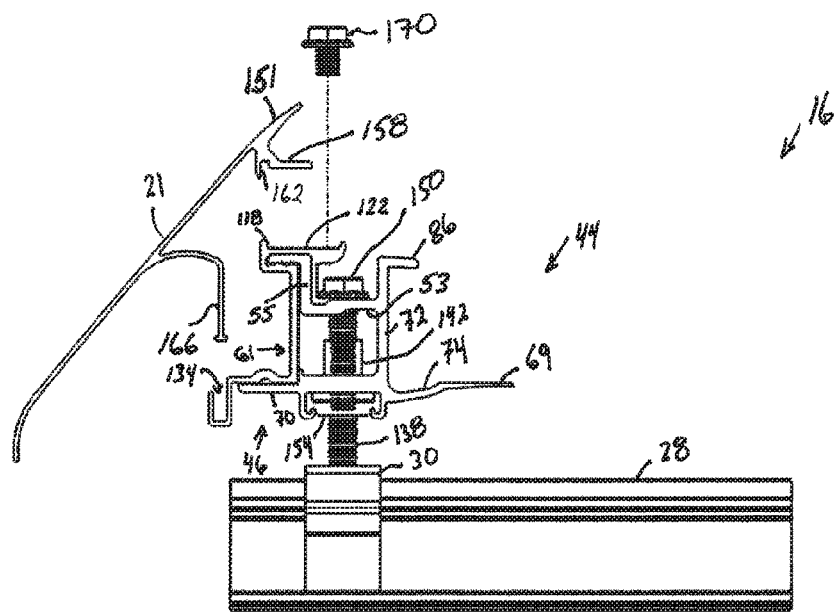
FIG. 15 is a partial exploded view of a skirt and the mounting bracket of FIG. 4.
Figure 16:
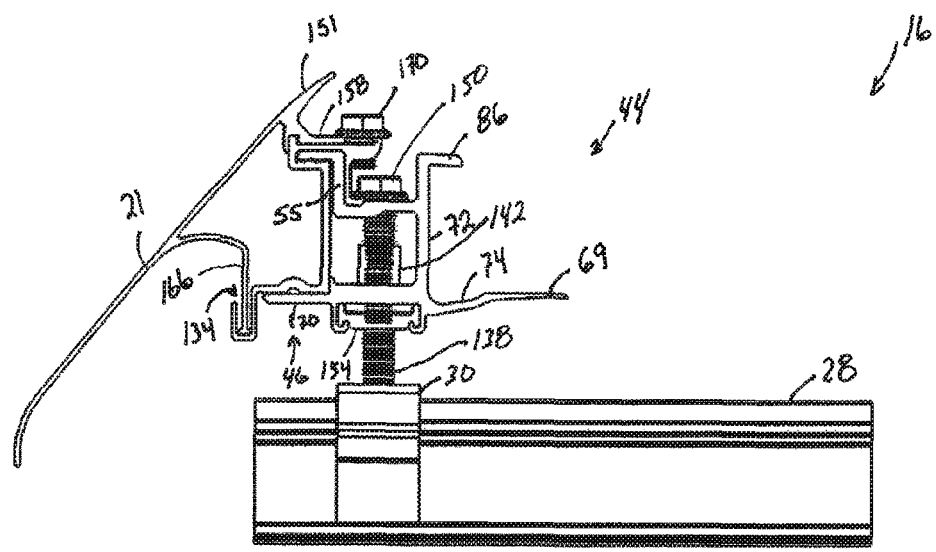
FIG. 16 is a side view of the skirt coupled to the mounting bracket of FIG. 15.
Figure 17:
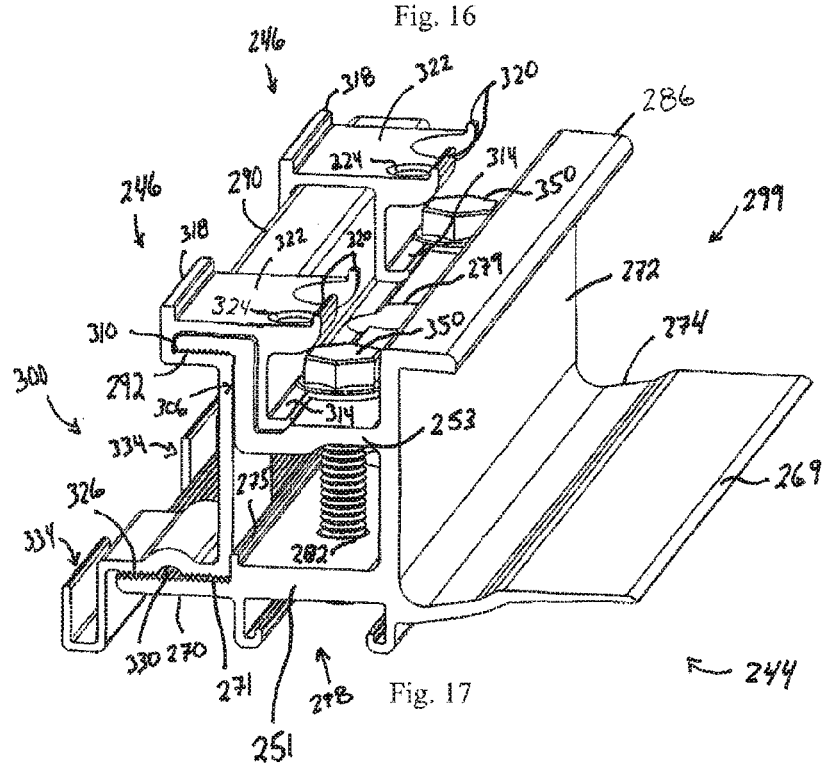
FIG. 17 is a perspective view of a mounting bracket coupled to removable skirt brackets according to some embodiments of the invention.
Figure 18:
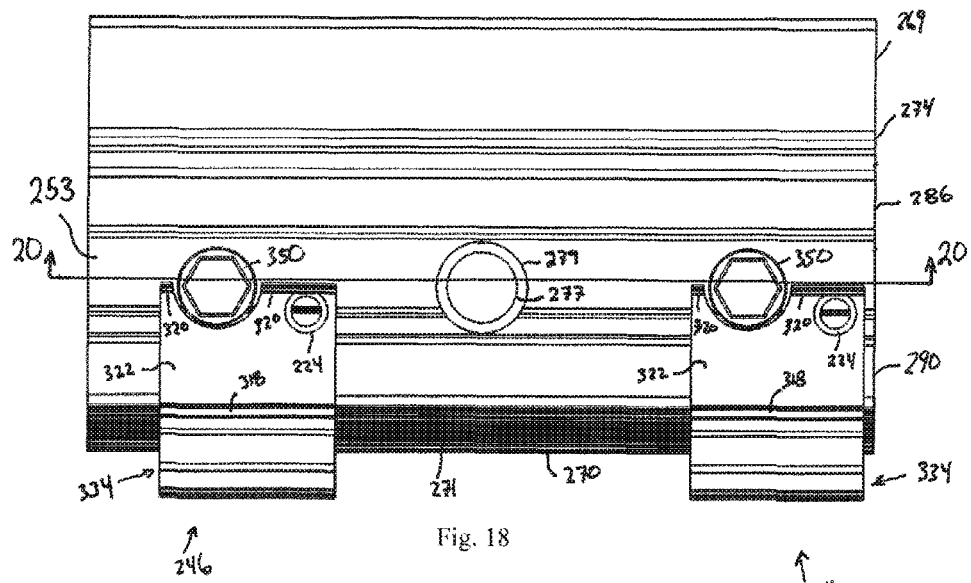
FIG. 18 is a top view of FIG. 17.

With reference to FIGS. 15 and 16, the skirt 21 is connectable to the mounting bracket 16 via the skirt bracket 46. The illustrated skirt 21 includes a snow guard 151, a skirt flange 158 having a slot 162, and a lower projection 166 extending away from the upper projection 158. The lower projection 166 is sized to be received within the channel 134 and the upper projection 158 is configured to abut the top surface 122 with the slot 162 engaging the rail 118. In the illustrated embodiment, a fastener 170 engages the threaded aperture 124 for a portion of the fastener 170 to engage the upper projection 158 and the finger 120 to clamp the upper projection 158 against the top surface 122. In other embodiments, the skirt 21 and the skirt bracket 46 may be one integral component.

In operation of securing the solar panels 14 to the mounting brackets 16, the clamp 44 is adjusted to a desired height above the roof 12 by rotating the adjustment nut 142 with a socket wrench or the like that is received through the corresponding aperture 94. By rotating the adjustment nut 142 relative to the stud 138, the clamp 44 translates along the second axis 102 because the protrusion 146 is constrained between the clamp 44 and the insert 154. A first solar panel 14 is placed on the second support flange 70 such that an edge of the first solar panel 14 abuts the divider 75 and the second upright portion 55. The teeth 71 increase the coefficient of friction between the first solar panel 14 and the clamp 44 to prevent the first solar panel 14 from slipping off of the second support surface 70. In the illustrated embodiment, the height of the first solar panel 14 is less than the distance 97 so that the teeth 92 of the second clamp flange 90 are disengaged from the first solar panel 14 when the first solar panel 14 is parallel to the second support flange 70.

Once the first solar panel 14 is supported on the second support surface 70, the fastener 150, which extends through the aperture 94 and the threaded aperture 82, is tightened to clamp the clamp 44 onto the first solar panel 14. In particular, the fastener 150 is tightened by the same socket wrench that engages the adjustable nut 142. As the fastener 150 is tightened, a moment force acts on the resilient wall 72 because the fastener 150 is offset from the resilient wall 72, which deflects the wall 72 and the upper central portion 53 towards the divider 75. As such, the second distance 97 decreases for the second upper clamp flange 90 to clamp onto the first solar panel 14 to fix the first solar panel 14 to the mounting bracket 16. At the same instance when the wall 72 and the upper central portion 53 deflect towards the divider 75, the first distance 96 increases. The increased first distance 96 creates enough clearance between the first support flange 69 and the first upper clamp flange 86 for an edge of a second solar panel 14 to engage the depression 74. Specifically, the solar panel 14 is oriented at an acute angle relative to the roof 12, before the second solar panel 14 is rotated downwardly to contact the first support surface 69, thereby clamping the second solar panel 14 between the first clamp flange 86 and the first support surface 69. The illustrated mounting bracket 16 allows an operator to tighten the fastener 150 once to secure two solar panels 14 to the mounting bracket 16 at different instances in time. In contrast, as the fastener 150 is loosened to remove the solar panels 14 from the mounting bracket 16, the first distance 96 decreases and the second distance 97 increases.

FIGS. 17-20 illustrate a clamp 244 according to another embodiment. The clamp 244 is similar to the clamp 44; therefore, like components have been given like reference numbers incremented by 200 and only the differences between the clamps will be discussed in detail. In addition, components or features described with respect to only one or some of the embodiments described herein are equally applicable to any other embodiments described herein.

The illustrated clamp 244 includes skirt brackets 246, a lower central portion 251, a first support flange 269, a second support flange 270, and a resilient wall 272. The illustrated first support flange 269 includes a depression 274, and the illustrated second support flange 270 includes teeth 271 adjacent a divider 275. The illustrated lower central portion 251 defines a first central aperture 277 and two threaded apertures 282.

A first upper clamp flange 286 and an upper central portion 253 extend oppositely from the wall 272 with the upper central portion 253 coupled to a second upright portion 255 and the second upright portion 255 coupled to a second upper clamp flange 290. The illustrated upper central portion 253 includes a second central aperture 279 concentric with the first central aperture 277, and apertures 294 that are concentric with the threaded apertures 282. In the illustrated embodiment, a gap 261 is positioned between the divider 275 and the upper central portion 253. In addition, a channel 298 is formed below the lower central portion 251 extending towards the roof 12.

Figure 19:
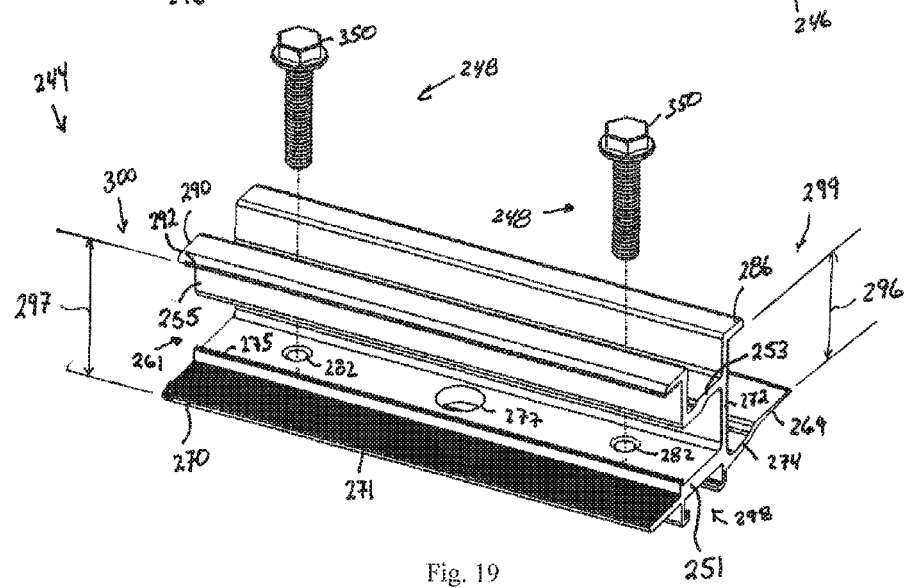
FIG. 19 is an exploded view of the mounting bracket of FIG. 17 with the skirt brackets removed.
Figure 20:
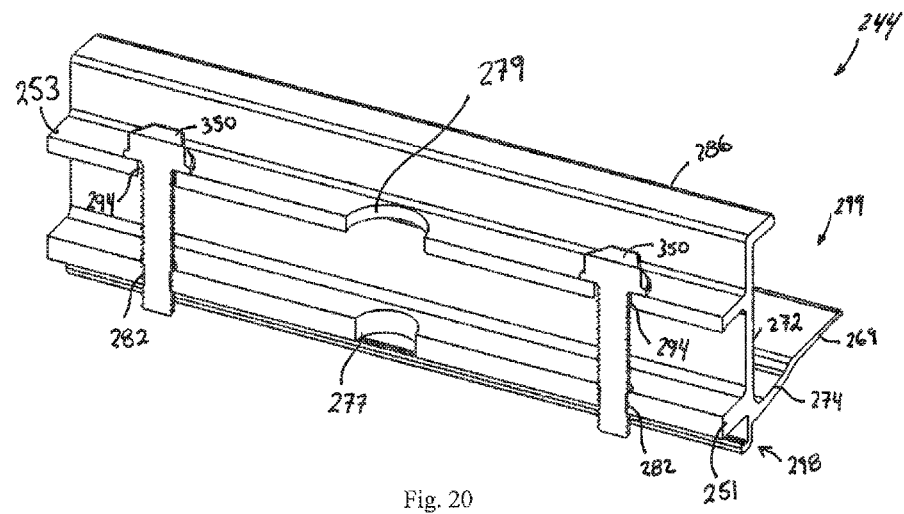
FIG. 20 is a cross sectional view of the mounting bracket taken along line 20-20 of FIG. 18.
Figure 21:
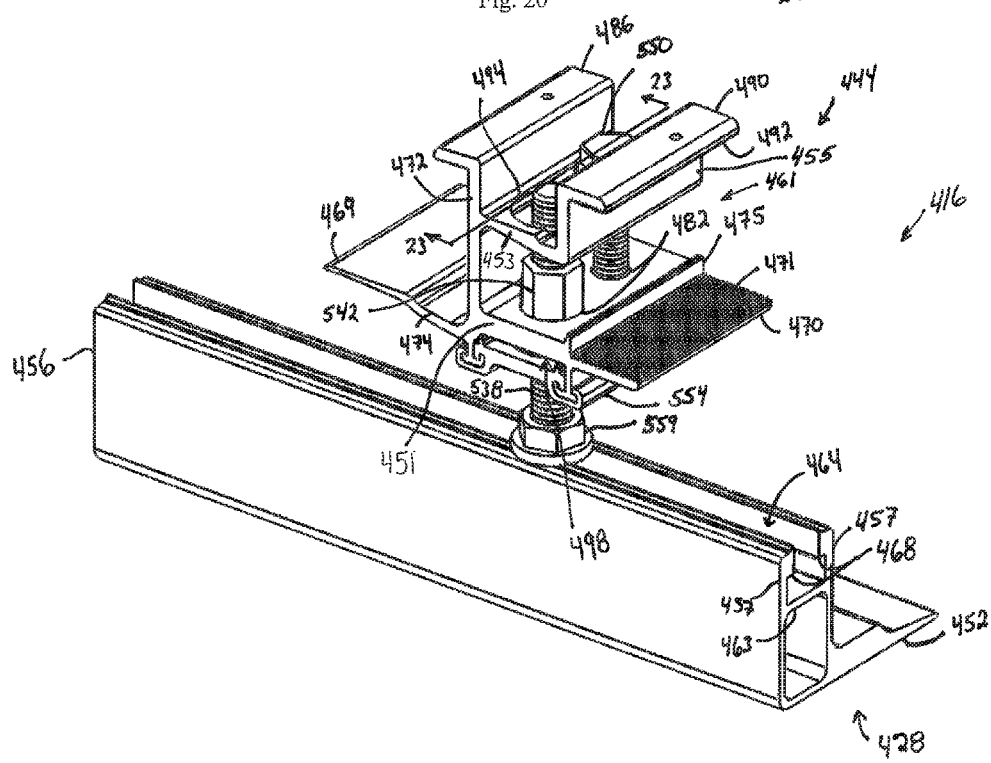
FIG. 21 is a perspective view of a mounting bracket according to some embodiments of the invention.

With reference to FIG. 19, the illustrated first upper clamp flange 286 is spaced from the first support flange 269 by a first distance 296 defining a first recess 299, and the illustrated second upper clamp flange 290 is spaced from the second support flange 270 by a second distance 297 defining a second recess 300.

In some embodiments, as described in detail below, the clamp 244 may include contacts (not shown) that protrude from the clamp flanges 286, 290 toward the corresponding support flange 269, 270. In further embodiments, the contacts may protrude from the support flange 269, 270 toward the corresponding clamp flange 286, 290. The contacts provide direct engagement between the mounting bracket 216 and the solar panels 14 enabling electrical current to flow therebetween.

The illustrated clamp 244 includes two skirt brackets 246 each having a channel 306 with teeth 310, a clamp surface 314, a rail 318, fingers 320, and a top surface 322 having a threaded aperture 324. The illustrated skirt brackets 246 also include teeth 326 configured to engage the teeth 271 and are separated into two portions by a raised surface 330. The illustrated skirt brackets 246 further include a channel 334 that extends below the second support flange 270. In other embodiments, the skirt brackets 246 may be one skirt bracket extending the substantial length of the mounting bracket 216.

The illustrated adjustment assembly 248 includes fasteners 350 that threadably engage the apertures 282 and extending through the apertures 294. In other embodiments, at least one insert, similar to the insert 154, that includes a threaded aperture may be received within the channel 298 to threadably engage at least one fastener.

In operation, the mounting bracket 216 can couple two solar panels 14 together, four solar panels 14 together, or two solar panels 14 in combination with at least one skirt 21 together. The mounting bracket 216 provides support to adjacent solar panels 14 and/or adjacent skirts 21 without coupling the mounting bracket 216 directly to the roof 12. When clamping the mounting bracket 216 onto solar panels 14, the process is similar to the mounting bracket 16 as described above.

FIGS. 21-29 illustrate a mounting bracket 416 according to another embodiment. The mounting bracket 416 is similar to the mounting bracket 16; therefore, like components have been given like reference numbers incremented by 400 and only the differences between the mounting brackets will be discussed in detail. In addition, components or features described with respect to only one or some of the embodiments described herein are equally applicable to any other embodiments described herein.

Figure 22:
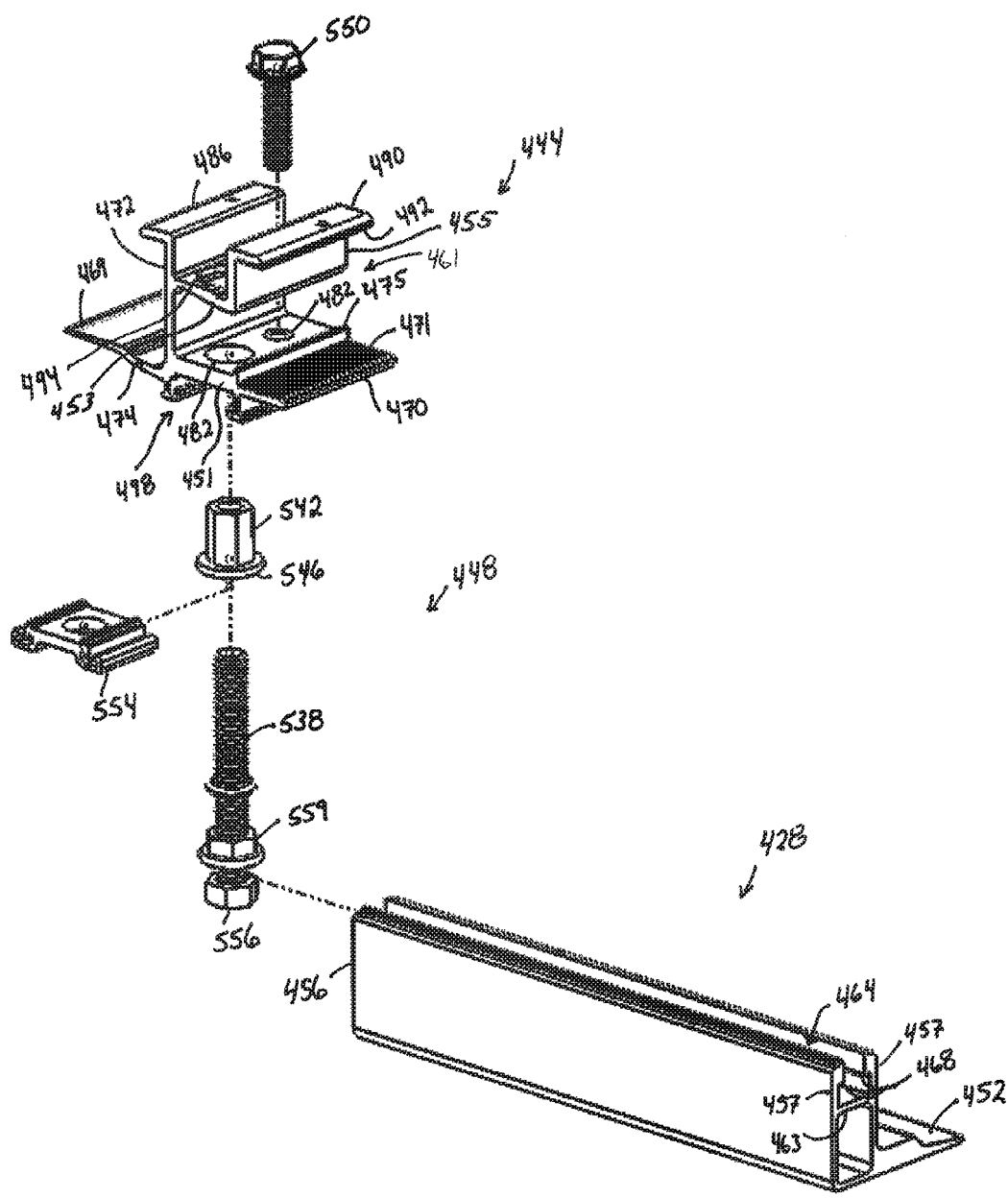
FIG. 22 is an exploded view of the mounting bracket of FIG. 21.
Figure 25:
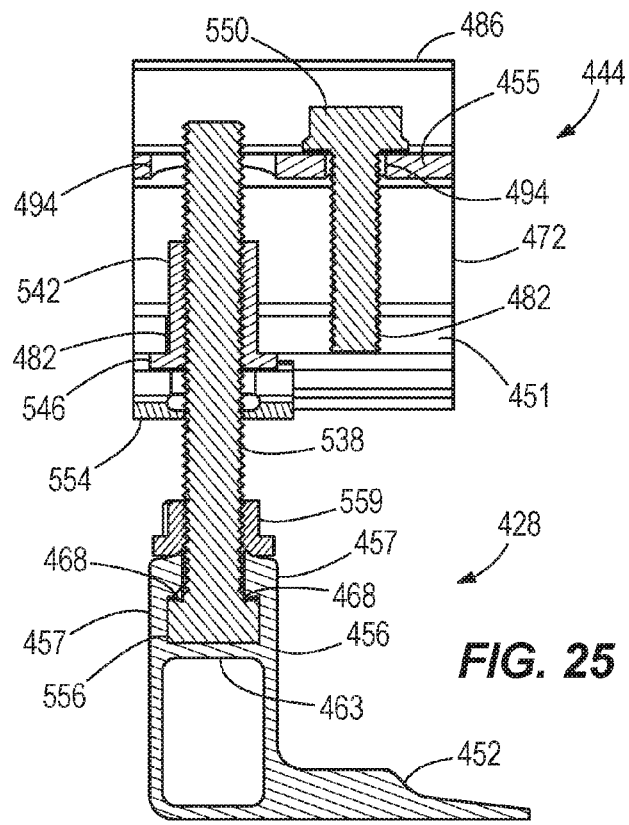
FIG. 25 is a front view of the mounting bracket of FIG. 23.

The illustrated mounting bracket 416 includes a base 428, a clamp 444, a skirt bracket 446 (FIG. 28), and an adjustment assembly 448 (FIG. 22). The illustrated base 428 defines unitary, monolithic construction including a first portion 452 that is substantially parallel with the roof 12, a second portion 456 having arms 457 that are substantially perpendicular with the roof 12, and a portion 463 connecting the arms 457 together. The illustrated first portion 452 includes a mounting aperture 460 (FIG. 23) located closer to an edge of the base 428 rather than being centered on the base 428. The mounting aperture 460 is sized to receive a fastener, such as the roof fastener 20, such that the base 428 is rotatable relative to the roof 12. Each illustrated arm 457 includes a ridge 468 extending towards the first portion 452 with the arms 457 and the portion 463 defining a channel 464 extending the entire length of the base 428. The channel 464 generally defines a "T" shaped opening. In other embodiments, the ridges 468 may be located on the top surface of the arms 457 extending away from the first portion 452. In further embodiments, the ridges 468 may be located on the top and bottom surfaces of the arms 457.

The illustrated clamp 444 includes a lower central portion 451, a first support flange 469, a second support flange 470, and a resilient wall 472. The lower central portion 451 and the resilient wall 472 are positioned between the support flanges 469, 470. The illustrated first support flange 469 includes a depression 474, and the illustrated second support flange 470 includes teeth 471 adjacent a divider 475. The illustrated lower central portion 451 defines apertures 482. A first upper clamp flange 486 and an upper central portion 453 extend oppositely from the wall 472 with the upper central portion 453 coupled to a second upright portion 455 and the second upright portion 455 coupled to a second upper clamp flange 490. The illustrated upper central portion 453 defines apertures 494. In the illustrated embodiment, a gap 461 is positioned between the divider 475 and the second upright portion 455. In addition, a channel 498 is formed below the support flanges 469, 470 extending towards the base 428 with the clamp 444 moveable relative to the base 428 along a second axis 502.

Figure 26:
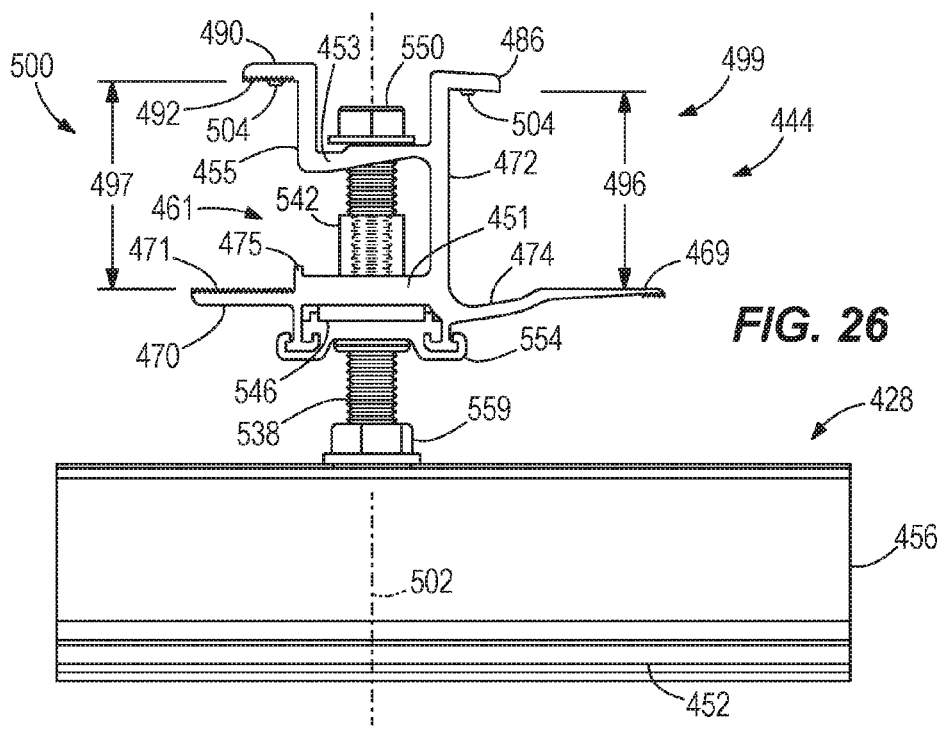
FIG. 26 is a right side view of the mounting bracket of FIG. 21.
Figure 27:
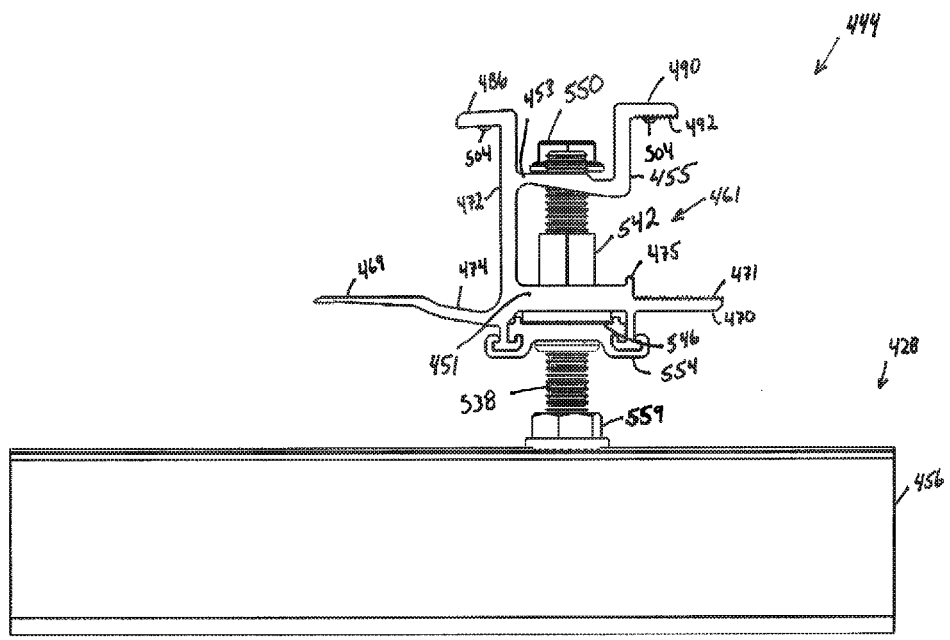
FIG. 27 is a left side view of the mounting bracket of FIG. 21.

With reference to FIG. 26, the illustrated first upper clamp flange 486 is spaced from the first support flange 469 by a first distance 496 defining a first recess 499, and the illustrated second upper clamp flange 490 is spaced from the second support flange 470 by a second distance 497 defining a second recess 500.

The illustrated clamp 444 also includes contacts 504 that protrude from the clamp flanges 486, 490 towards the corresponding support flange 469, 470. In other embodiments, the contacts 504 may protrude from the support flange 469, 470 toward the corresponding clamp flange 486, 490. The contacts 504 provide direct engagement between the mounting bracket 416 and the solar panels 14 enabling electrical current to flow therebetween.

Figure 28:
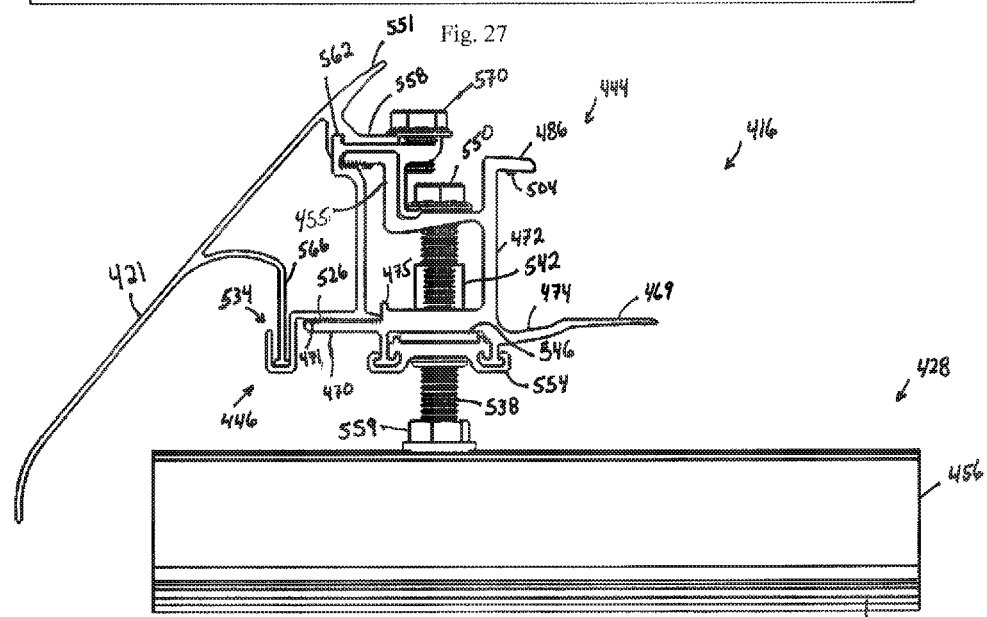
FIG. 28 is a side view of the mounting bracket of FIG. 21 including a skirt bracket coupled to a skirt.
Figure 29:
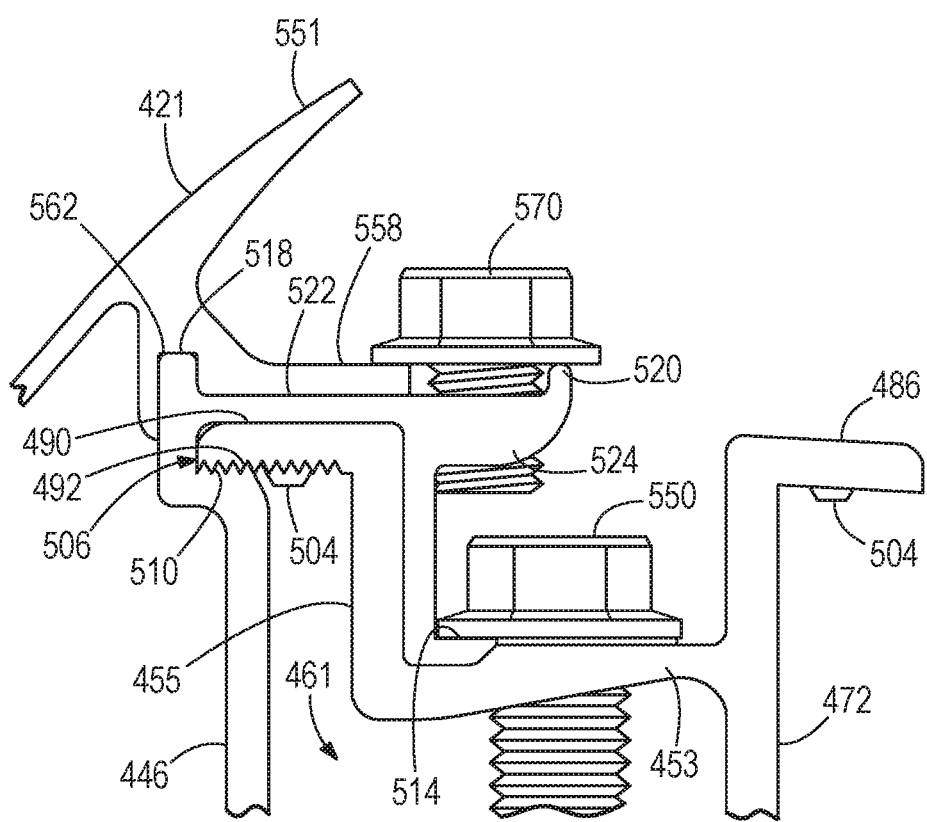
FIG. 29 is a detailed view of the mounting bracket, the skirt bracket, and the skirt of FIG. 28.

With reference to FIGS. 28 and 29, the skirt bracket 446 includes a channel 506 having teeth 510. The illustrated skirt bracket 446 also includes a clamp surface 514 and a top surface 522 having a threaded aperture 524 positioned between a rail 518 and fingers 520. The illustrated skirt bracket 446 extends from the upper clamp flange 490 to the second support flange 470 with the skirt bracket 446 including teeth 526 configured to engage the teeth 471. In other embodiments, a roughened surface may replace the teeth 471, 492, 510, 526. The illustrated skirt bracket 446 also includes a channel 534 that extends below the second support flange 470 and away from the second clamp flange 490.

The illustrated adjustment assembly 448 includes a stud 538, an adjustment nut 542 having a protrusion 546, a fastener 550, an insert 554, and a lock nut 559. The stud 538 includes a head 556 sized to be received within the channel 464 of the base 428, and the stud 538 extends from the base 428 with the lock nut 559 received on the stud 538 between the base 428 and the clamp 444. As the lock nut 559 is tightened onto the stud 538, the head portion 556 and/or the lock nut 559 deforms the ridges 468 so that the stud 538 does not move relative to the base 428. The clamp 444 is received on the stud 538 via the non-threaded aperture 482. The adjustment nut 542 is also received through the non-threaded aperture 482 with the corresponding aperture 494 providing access to the adjustment nut 542. The insert 554 slidably engages the channel 498 below the adjustment nut 542. The illustrated insert 554 abuts the protrusion 546 to hold the adjustment nut 542 in place within the aperture 482. The adjustment nut 542 and the insert 554 are both received on the stud 538. The fastener 550 is received through the other aperture 494 to engage the threaded aperture 482.

With reference to FIGS. 28 and 29, a skirt 421 is connectable to the mounting bracket 416 via the skirt bracket 446. The illustrated skirt 421 includes a snow guard 551, an upper projection 558 having a slot 562, and a lower projection 566 extending away from the upper projection 558. The lower projection 566 is sized to be received within the channel 534 and the upper projection 558 is configured to abut the top surface 522 with the slot 562 engaging the rail 518. In the illustrated embodiment, a fastener 570 engages the threaded aperture 524 for a portion of the fastener 570 to engage the upper projection 558 and the fingers 520 to clamp the upper projection 558 against the top surface 522. In other embodiments, the skirt 421 and the skirt bracket 446 may be one integral component.

The invention claimed is:

1. A solar panel clamp, comprising:
   a pedestal;
   a support shelf including,
     a first body portion,
     a shelf portion extending from the body portion,
     a channel defined in the body portion;
   a top clamp including,
     a second body portion,
     a clamp portion extending from the second body portion,
     wherein the shelf portion is disposed below the clamp portion to form a recess that is configured to receive a solar panel; and
   a leveling element disposed in the channel and configured to carry the support shelf,
     wherein a distance between the solar panel clamp and a roof surface changes in response to actuating the leveling element in response to the solar panel clamp being installed on the roof surface, and
     wherein the support shelf changes position relative to the pedestal in response to actuating the leveling element.

2. The solar panel clamp of claim 1, wherein the pedestal comprises at least one of threads or teeth.

3. The solar panel clamp of claim 2, wherein the leveling element is configured to engage the at least one of the threads and the teeth.

4. The solar panel clamp of claim 1, wherein the solar panel clamp is mounted on a slide.

5. The solar panel clamp of claim 4, wherein the slide comprises a top, a bottom a first side and a second side;
   a first channel defined in the first side, wherein the first channel extends along a length of the slide;
   a second channel defined in the second side, wherein the second channel extends along the length of the slide;
   a hole defined through the;
     wherein the slide is configured to be attached to a roof surface with a fastener that is installable through the hole.

6. The solar panel clamp of claim 1, wherein the leveling element is at least one of a nut, or a fastener.

7. The solar panel clamp of claim 1, wherein the leveling element is accessible through a hole defined in the top clamp.

8. The solar panel clamp of claim 1, wherein the leveling element is captured in the channel in response to the support shelf being installed on the pedestal.

9. The solar panel clamp of claim 1, wherein the leveling element is actuated to change the height of the solar panel clamp in response to a solar panel being installed in the solar panel clamp.

10. The solar panel clamp of claim 1, wherein the support shelf and the top clamp are formed as a single piece.

11. A roof mount, comprising:
    a base comprising at least one of threads or teeth;
    a clamp assembly, including
      a support shelf including,
        a first body portion,
        a shelf portion extending from the body portion,
        a slot defined in the body portion;
      a top clamp including,
        a second body portion,
        a clamp portion extending from the second body portion,
      wherein the support shelf and top clamp define a recess between the shelf portion and the clamp portion that is configured to receive and retain a solar panel; and
    a leveling element disposed within the slot of the support shelf and configured to carry the support shelf, the leveling element configured to engage at least one of the threads and the teeth,
    wherein the leveling element is accessible from a top side of the clamp assembly, the leveling element configured to adjust the vertical position of the clamp assembly relative to the base.

12. The roof mount of claim 11, wherein the solar panel clamp is mounted on a slide.

13. The roof mount of claim 12, wherein the slide comprises a top, a bottom a first side and a second side;
    a first channel defined in the first side, wherein the first channel extends along a length of the slide;
    a second channel defined in the second side, wherein the second channel extends along the length of the slide;
    a hole defined through the slide;
      wherein the slide is configured to be attached to a roof surface with a fastener that is installable through the hole.

14. The roof mount of claim 12, wherein flashing is disposed below the slide in response to the roof mount being installed on a roof surface.

15. The roof mount of claim 11, wherein flashing and a slide are secured to the roof surface with a fastener and a seal.

16. The roof mount of claim 11, wherein the clamp assembly is formed as a single piece.

\* \* \* \* \*